US012802585B2

(12) United States Patent
Delisle et al.

(10) Patent No.: US 12,802,585 B2
(45) Date of Patent: Nov. 17, 2026

(54) HYBRID INSTRUCTOR-MACHINE ASSESSMENT SYSTEM, DYNAMIC INSTRUCTOR INTERFACE AND ADAPTIVE TRAINING

(71) Applicant: CAE Inc., Saint-Laurent (CA)

(72) Inventors: Jean-Francois Delisle, Saint-Laurent (CA); David Bowness, Saint-Laurent (CA)

(73) Assignee: CAE Inc., Saint-Laurent (CA)

( * ) Notice: Subject to any disclaimer, the term of this patent is extended or adjusted under 35 U.S.C. 154(b) by 9 days.

(21) Appl. No.: 19/101,894

(22) PCT Filed: Aug. 7, 2023

(86) PCT No.: PCT/CA2023/051053
§ 371 (c)(1),
(2) Date: Feb. 6, 2025

(87) PCT Pub. No.: WO2024/031182
PCT Pub. Date: Feb. 15, 2024

(65) Prior Publication Data

US 2026/0045173 A1 Feb. 12, 2026

Related U.S. Application Data

(60) Provisional application No. 63/370,671, filed on Aug. 7, 2022.

(51) Int. Cl.
*G09B 9/08* (2006.01)

(52) U.S. Cl.
CPC .................................... *G09B 9/08* (2013.01)

(58) Field of Classification Search
CPC ...................................................... G09B 9/08
See application file for complete search history.

(56) References Cited

U.S. PATENT DOCUMENTS

2020/0143699 A1 5/2020 Pashayev et al.
2020/0306959 A1 10/2020 Huang et al.
(Continued)

FOREIGN PATENT DOCUMENTS

AU 2020102976 A4 12/2020
CN 114373360 A 4/2022

OTHER PUBLICATIONS

International Search Report dated Nov. 17, 2023 for corresponding PCT/CA2023/051053.

*Primary Examiner* — Kesha Frisby
(74) *Attorney, Agent, or Firm* — Gowling WLG (Canada) LLP

(57) ABSTRACT

A computerized system for assessing performance includes an interactive computer simulation station for providing a simulation of a machine to train a student in how to operate the machine and an instructor operating station communicatively connected to the interactive computer simulation station to receive instructor assessment data from an instructor at the instructor operating station. The system includes an automatic rules-based assessment module for automatically assessing a performance of the student during the simulation based on one or more rules to thereby provide automatic assessment data. The system includes an artificial intelligence (AI) module for receiving both the instructor assessment data and the automatic assessment data and for providing a hybrid performance assessment of the student based on an AI assessment model trained using training sets of instructor assessment data and training sets of automatic assessment data.

27 Claims, 7 Drawing Sheets

(56) References Cited

U.S. PATENT DOCUMENTS

| | | | |
|---|---|---|---|
| 2021/0343177 | A1 | 11/2021 | Coppersmith, III |
| 2022/0005595 | A1 | 1/2022 | Qayumi |

HYBRID INSTRUCTOR-MACHINE ASSESSMENT SYSTEM, DYNAMIC INSTRUCTOR INTERFACE AND ADAPTIVE TRAINING

CROSS-REFERENCE TO RELATED APPLICATIONS

This application claims priority to U.S. Provisional Patent Application 63/370,671 which is hereby incorporated by reference.

TECHNICAL FIELD

The present invention relates generally to computer-based systems and computer-implemented methods for training and, more specifically, to computer-based systems and computer-implemented methods for training a student in the operation of a machine such as an aircraft.

BACKGROUND

Simulation-based training is used to train students in how to operate complex machines such as, for example, how to pilot an aircraft. In most flight simulators, an instructor at an instructor operating station monitors the performance of the student to grade the performance, to provide feedback to the student and to prescribe further lessons. Human monitoring and grading is subjective, prone to oversight, and provides only limited insight into the student's behavior. Computer-implemented rules-based assessment on the other hand is complex and time-consuming to configure, lacks nuance and often fails to account for human factors and contextual nuances.

A technical solution to this problem would be highly desirable.

SUMMARY

In general, the present invention provides a computerized system, method and computer-readable medium for assessing performance using an artificial intelligence module that uses both automatic rules-based assessments and instructor assessments to assess the performance of a student in a simulation. Also disclosed herein is a method of adapting the training based on the performance assessment. Furthermore, the present disclosure also provides a dynamic instructor display in the instructor operating station that adapts dynamically to the performance of the student.

One inventive aspect of the disclosure is a computerized system for assessing performance that includes an interactive computer simulation station for providing a simulation of a machine to train a student in how to operate the machine and an instructor operating station communicatively connected to the interactive computer simulation station to receive instructor assessment data from an instructor at the instructor operating station. The system includes an automatic rules-based assessment module for automatically assessing a performance of the student during the simulation based on one or more rules to thereby provide automatic assessment data. The system includes an artificial intelligence (AI) module for receiving both the instructor assessment data and the automatic assessment data and for providing a hybrid performance assessment of the student based on an AI assessment model trained using training sets of instructor assessment data and training sets of automatic assessment data.

Another inventive aspect of the disclosure is a computer-implemented method of providing a simulation of a machine, by an interactive computer simulation station, to train a student in how to operate the machine. The method entails receiving instructor assessment data from an instructor at the instructor operating station that is communicatively connected to the interactive computer simulation station. The method further entails automatically assessing a performance of the student during the simulation based on one or more rules in an automatic rules-based assessment module to thereby provide automatic assessment data. The method includes receiving both the instructor assessment data and the automatic assessment data by an artificial intelligence (AI) module. The method further includes providing a hybrid performance assessment of the student by the AI module based on an AI assessment model trained using training sets of instructor assessment data and training sets of automatic assessment data.

Another inventive aspect of the disclosure is a non-transitory computer-readable medium having instructions in code which are stored on the computer-readable medium and which, when executed by one or more processors of one or more computers, cause the one or more computers to assess performance by providing a simulation of a machine, by an interactive computer simulation station, to train a student in how to operate the machine and receiving instructor assessment data from an instructor at the instructor operating station that is communicatively connected to the interactive computer simulation station. The code causes the one or more computers to automatically assess a performance of the student during the simulation based on one or more rules in an automatic rules-based assessment module to thereby provide automatic assessment data. The code also causes the one or more computers to receive both the instructor assessment data and the automatic assessment data by an artificial intelligence (AI) module. The code furthermore causes the one or more computers to provide a hybrid performance assessment of the student by the AI module based on an AI assessment model trained using training sets of instructor assessment data and training sets of automatic assessment data.

The foregoing presents a simplified summary of the invention in order to provide a basic understanding of some aspects of the invention. This summary is not an exhaustive overview of the invention. It is not intended to identify essential, key or critical elements of the invention or to delineate the scope of the invention. Its sole purpose is to present some concepts in a simplified form as a prelude to the more detailed description that is discussed later. Other aspects of the invention are described below in relation to the accompanying drawings.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
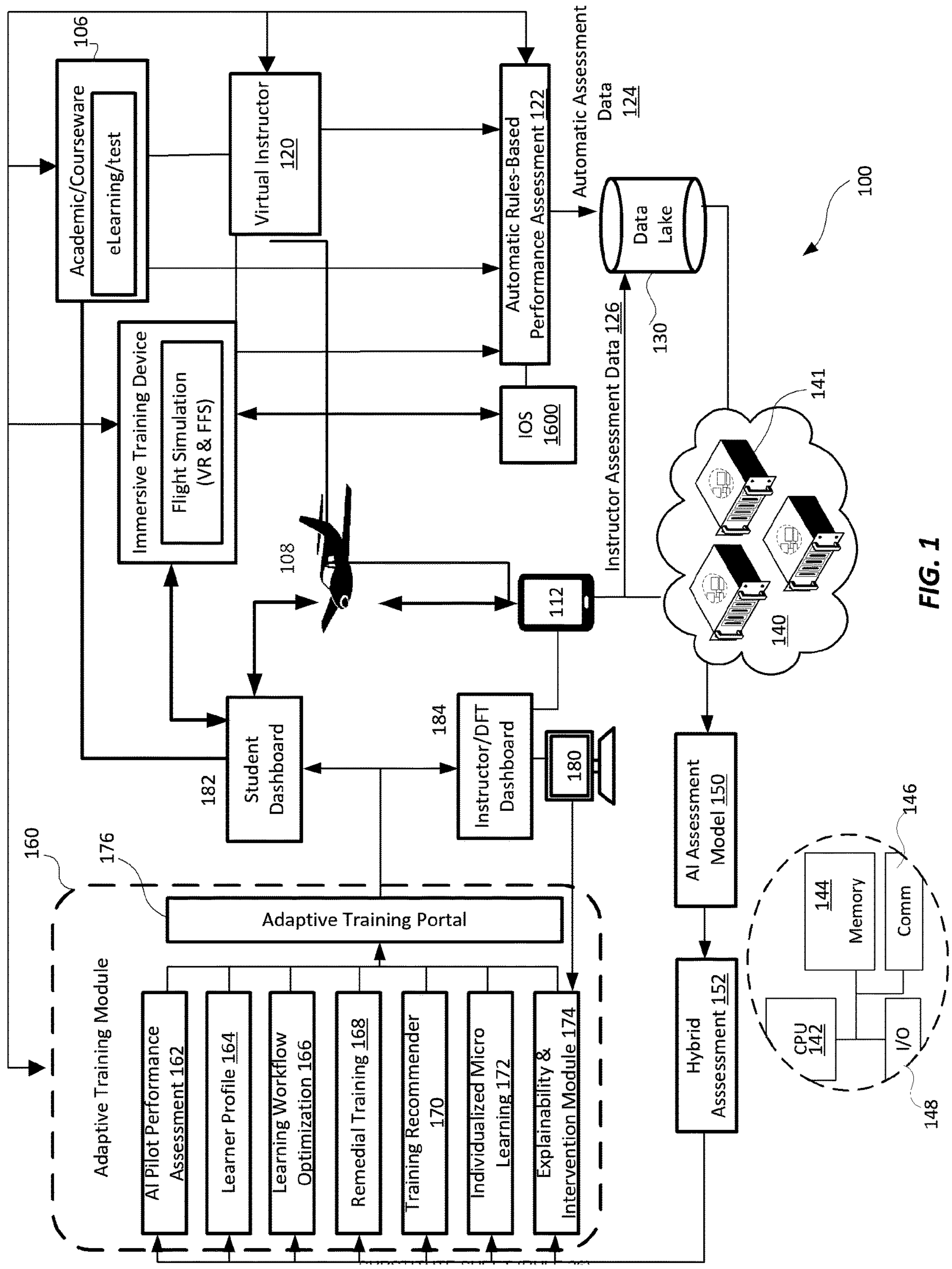
FIG. 1 depicts a system for assessing performance in accordance with an embodiment of the present invention.

FIG. 1 depicts a computerized system for training a student to operate an actual machine in accordance with an embodiment of the present invention. In this specification, the expression "actual machine" is used to distinguish from a simulated machine that is simulated in a computer simulation to function like the actual machine to thereby train the student in the operation of the actual machine. A flight simulator that simulates the operation of an actual aircraft is one example. The student is a person seeking to learn to operate the actual machine, i.e., a physical and tangible (real-world) machine. The actual machine may be a vehicle such as an aircraft, ship, spacecraft or the like. The actual machine may also be non-vehicular equipment such as a power station, healthcare or medical system, cybersecurity system, or the like. In this specification, the expression "student" is used in an expansive sense to also encompass any person who is training to improve or hone knowledge, skills or aptitude in the operation of the actual machine such as, for example, a licensed pilot who is doing periodic training for certification purposes.

In the embodiment depicted by way of example in FIG. 1, the computerized system is generally designated by reference numeral 100. The computerized system 100 is designed to assess performance of a student pilot (hereinafter also referred to as simply the student, trainee or operator depending on the particular context). The system 100 may be used as part of a training system or, more particularly an adaptive training system, for training the student to operate an actual machine such as an aircraft. This training may be delivered to the student by providing the student a diverse learning ecosystem (composed of multiple learning environments) that optionally uses an artificial intelligence to adapt to the learning of the student. In the specific example of FIG. 1, the computerized system 100 is a pilot training system for training a student pilot to fly an aircraft. The computerized system 100 may be used, with suitable modifications, to train students to operate other types of vehicular machines such a land vehicles, warships, submarines, spacecraft or to operate non-vehicular machine such as nuclear power stations, cybersecurity command centers, military command centers, etc.

In the embodiment depicted by way of example in FIG. 1, the computerized system 100 is designed to assess performance using a hybrid assessment approach involving both instructor assessments and automatic rules-based assessments. As will be explained in greater detail below, the system 100 employs an artificial intelligence module to create a machine learning grading model (referred to herein as an AI assessment model) that assesses student performance. The AI assessment model is trained using sets of instructor assessment data and sets of automatic rules-based assessment data. Once trained, the AI assessment model is configured to assess a particular student's performance from specific instructor assessment data and automatic assessment data to provide a hybrid performance assessment of the student based on the AI assessment model.

In the embodiment depicted in FIG. 1, the system 100 includes an interactive computer simulation station (e.g. the interactive computer simulation station 1100 of FIG. 2) for providing a simulation of a machine to train a student in how to operate the machine. In one example, the simulation is a flight simulation and the machine is an aircraft. However, it will be appreciated that the simulation may be another type of simulation that simulates another type of machine, such as for example, another type of vehicle (e.g. land vehicle, ship, submarine, spacecraft, etc.) or a non-vehicular machine (e.g. a power station). In the embodiment depicted in FIG. 1, the system 100 includes an instructor operating station (IOS) 1600 communicatively connected to the interactive computer simulation station 1100 to receive instructor assessment data from an instructor at the IOS 1600, which are stored in an instructor assessment data storage 126. The instructor data may be input manually by the instructor via an instructor computing device during the simulation. The instructor may grade performance using any suitable grading, marking or evaluation scheme or methodology. The system 100 also includes an automatic rules-based assessment module 122 for automatically assessing a performance of the student during the simulation based on one or more rules to thereby provide automatic assessment data for storing in an automatic assessment data storage 124. The automatic rules-based assessment may be performed by comparing flight telemetry data representing flight maneuvers performed by the student to prescribed norms, benchmarks, operating standards or acceptable ranges thereof. The system as depicted by way of example in FIG. 1 may include a data lake 130 as a repository for the instructor assessment data 126 and the automatic assessment data 124. The system 100 comprises an artificial intelligence (AI) module 140 for receiving both the instructor assessment data 126 and the automatic assessment data 124 and for providing a hybrid performance assessment 152 of the student. The hybrid performance assessment 152 is based on an AI assessment model 150 that has been previously trained using training sets of instructor assessment data 126 and training sets of automatic assessment data 124 stored in the data lake 130. Alternatively, after its initial training phase, the AI assessment model 150 may be refined by ongoing training of the model using additional data received from student assessments. In other words, the AI assessment model 150 may continue to evolve over time by using the student assessment data to not only provide the hybrid performance assessment 152 but also to use that newly obtained student assessment data to further refine the AI assessment model 150.

In one embodiment, the AI assessment model 150 is generated by developing a consensus among a plurality of different grading models. The different grading models may include a support vector machine model, a deep neural network, a convolutional neural network model and a decision tree extreme gradient boosting model. The support vector machine (SVM) is a method that strives to find a boundary which best separates two different classes. The SVM method does so by identifying the extreme points of the dataset which are close to the opposite class, and a support vector is then drawn between the two extreme points. The boundary is then established between these two support vectors. Out of all the separation options, the model chooses the option which yields the largest distance between the two support vectors. The deep neural network is a feed-forward network. Data flows from the input layer to the output layer without looping back to the input layer. The DNN employs a map of virtual neurons and assigns weights to connections between them. The convolutional neural network contains convolutional layers. The CNN includes an input layer, hidden middle layers and an output layer. The middle layers are hidden because their inputs and outputs are masked by the activation function. The decision tree extreme gradient boosting technique is a decision tree algorithm which incorporates multiple trees, randomly chosen features for each tree, using the output from one tree to the next tree to boost performance and using gradient descent to minimize errors.

In one embodiment, the AI assessment model 150 is built (i.e. generated or trained) by using all or a subset of these various algorithms in parallel to optimize, or at least nearly optimize, both accuracy and explainability.

In one embodiment, the AI module 140 communicates with the automatic rules-based assessment module 122 to adjust one or more of the rules of the automatic rules-based assessment module in response to detecting a grading discrepancy with the AI assessment model.

For example, as a simple illustration of AI-driven rule adjustment, the rules-based assessment may assess a student pilot banking an aircraft (in the simulator) to turn into a final approach for landing. In this example, the rules may prescribe a range of acceptable aircraft roll angles and a range of acceptable aileron deflections as well as a range of acceptable air speeds to prevent a tip stall during the turn. If the banking maneuver performed by the student in the simulator is outside the acceptable range of roll angle, then the automatic assessment assigns a low (or even failing) grade to the student for the maneuver. Likewise, if the pilot deflects the ailerons too much, the automatic assessment may assign a poor grade to the student for the excessive aileron control input. If the airspeed is too low, the rules-based assessment may assign a poor grade to the student for being too close to a stall speed. The extent of the deviation from the norm may be used to assign grades automatically to the student based on programmed rules. For example, as a simple illustration, if the airspeed falls below the stall speed, the automatic assessment module may assign a failing grade (F). If the airspeed comes to within 5% of the stall speed, the automatic assessment module may assign a poor grade (D). If the airspeed comes to within 5%-10% of the stall speed, the automatic assessment module may assign a mediocre grade (C). If the airspeed is within the acceptable range, the automatic assessment module may assign a good grade (B). If the airspeed is perfectly within the acceptable range, the automatic assessment module may assign an excellent grade (A). As shown in this example the objective grading is conducted based on prescribed rules based on a comparison of flight telemetry and prescribed quantifiable norms. However, in some unusual simulation scenarios, the context may require an intentional deviation from what the rules consider to be the prescribed norm. For example, in a simulation of extreme sudden turbulence or an air pocket causing one wing to drop, the pilot may need to perform an extreme aileron deflection to compensate for the turbulence or air pocket in which case the instructor may grade the student reaction extremely highly whereas the rules-based assessment, without appreciating the context, would give the student aileron deflection a poor grade. The machine learning of the AI module can be configured to learn that the human instructor's grade is preferred over the rules-based grade. In one implementation, the AI module can signal the rules-based assessment to adjust its rule or to add a further rule or a further condition for the application of the rule. For example, the rule could be adjusted to consider a sudden downdraft or air pocket in assessing whether the aileron deflection is appropriate in that specific context. As such, the rules can evolve and/or be refined over time by receiving feedback from the AI module.

In one embodiment, the AI module communicates with the instructor operating station (IOS) 1600 to display grading feedback to the instructor in response to detecting a grading discrepancy with the AI assessment model. In so doing, the AI module provides feedback to the instructor to enable the instructor to calibrate his or her grading. This feedback enables the instructor to recognize if he or she is being too lax or too strict in evaluating student performance in various tasks. For example, the grading feedback to the instructor may indicate if the instructor is an outlier in grading a particular flight maneuver and therefore should recalibrate the subjective evaluation of that particular flight maneuver to better align with other instructor evaluations of that same maneuver and/or the automatic assessments of that same flight maneuver.

FIG. 1 furthermore depicts various optional components and optional modules that may supplement the foregoing system to provide additional functionalities and features. As shown by way of example in FIG. 1, the system may include an electronic learning module 106 (Academic courseware and e-learning tools) for delivering electronic learning content to a student computing device used by the student. The electronic learning module may include reading material, audio presentations, video presentations, etc. as well as electronic tests to assess the student's learning of the subject matter.

In the embodiment depicted by way of example in FIG. 1, the simulation station (also referred to herein as an immersive training device) 1100 simulates operation of an actual machine. A simulation system 1000 having this simulation station 1100 will be described in greater detail below in relation to FIG. 2. The simulation station 1100 provides a simulated machine operable in the simulation system by the student. In this particular example, the simulation station 1100 is a flight simulator. As will be described in greater detail below, the system 100 optionally includes a virtual instructor 120. The automatic rules-based assessment module 122 receives telemetry data (flight maneuver data) from the simulation station 1100 and may optionally also receive performance data from the virtual instructor 120 and/or the electronic learning module 106.

In addition to the electronic learning and the simulation training, the student may optionally also practice actual flying of the aircraft 108 with an instructor 110 as co-pilot. The aircraft 108 is the actual machine in this particular example. The instructor 110 grades the performance of the student flying the aircraft 108. The instructor 110 may record grades and information of performance evaluations using an instructor computing device 112 such as a tablet or other mobile device. The actual flying, simulation training and electronic learning together constitute a diverse learning ecosystem composed of multiple learning environments for training the student. The automatic rules-based assessment module 122 provides automatic assessment data 124 to an automatic assessment data storage or to a data lake 130. The instructor assessment data 126 from the IOS 1600 and/or from the instructor computing device 112 is received and stored by an instructor assessment data storage or by the data lake 130. Both the instructor assessment data 126 and the automatic assessment data 124 are provided to the data lake 130 to be accessed by a cloud-based artificial intelligence (AI) module 140. The artificial intelligence module 140 develops an AI assessment model 150 using training sets of instructor assessment data 126 and automatic assessment data 124. The cloud-based artificial intelligence module 140 has a plurality of computers or servers 141. Each server 141 has a server processor or CPU 142, a memory 144, a data communication device 146 and may also include an input/output device 148. The AI module 140 generates the AI assessment model 150. This AI assessment model 150 is then used to perform a hybrid assessment 152 of a particular student based on the instructor assessment data 126 and the automatic assessment data 124 for a particular flight maneuver or event or for an entire lesson or any discrete portion thereof. The hybrid assessment 152 is thus based on an AI-driven model that benefits from attributes of both instructor assessments and automatic assessments. In one embodiment, the system 100 may optionally include an adaptive learning AI module 160 as shown in FIG. 1 for adapting a current training lesson and/or a lesson plan. The adaptive learning AI module (also referred to herein as an adaptive training module) 160 adapts dynamically to the performance of the student so as to customize, personalize or tailor the lessons (training exercises) to the particular learning profile of the student. For example, in one implementation, the adaptive learning AI (ALAI) module 160 may adapt the training in response to detecting a trigger or condition. The trigger or condition may be performance-related. For example, the trigger or condition may be obtained or extracted from the hybrid performance assessment of the student. It will be understood that the hybrid performance assessment of the student may be generated at the end of a lesson or in real-time during the lesson. In both cases, the adaptive learning AI module can react to the hybrid performance assessment to adapt the training to improve the learning experience for the student. For example, if the hybrid performance assessment 152 of the student shows a particular element of knowledge, skills or aptitude (KSA) that falls below a predetermined (minimum performance) threshold, the adaptive learning AI module can adapt the training to rectify the perceived lack of knowledge, skills or aptitude in a particular task or operation. The adaptive learning AI module 160 (adaptive training module) will be described in greater detail below. As depicted by way of example in FIG. 1, the ALAI module 160 is communicatively connected to the immersive training device 1100 as well as the academic/courseware module 106, the virtual instructor 120 and the automatic rules-based performance assessment module 122. As such, the ALAI module 160 can receive data from and/or transmit to data to the immersive training device 1100, the academic/courseware module 106, the virtual instructor 120 and the automatic rules-based performance assessment module 122. For example, in one particular implementation, the ALAI module 160 may receive data from the automatic rules-based performance assessment module 122 and transmit data recommending that the training be adapted to the performance of the student to the immersive training device 1100 and/or the academic/courseware module 106 and/or to the virtual instructor 120. The virtual instructor 120 in one embodiment can include two components providing two roles: virtual coach and flight training assistant. The virtual coach, in one embodiment, supplies expert guidance and insight to the student including providing session briefing, session debriefing as well as live feedback. The flight training assistant in one embodiment interacts with the simulator to control the training session, by interfacing with the IOS by loading lesson plans, toggling the simulation freeze and repositioning the simulator to a requested location.

The foregoing student performance assessments are administered primarily in the context of simulation training. For example, the simulation training may be flight training using a flight simulator as shown by way of example in FIG. 2. In the depicted example of FIG. 2, the interactive computer simulation station 1100 comprises a memory module 1120, a processor module 1130 and a network interface module 1140. The processor module 1130 may represent a single processor with one or more processor cores or an array of processors, each comprising one or more processor cores. In some embodiments, the processor module 1130 may also comprise a dedicated graphics processing unit 1132. The dedicated graphics processing unit 1132 may be required, for instance, when the interactive computer simulation system 1000 performs an immersive simulation (e.g., pilot training-certified flight simulator), which requires extensive image generation capabilities (i.e., quality and throughput) to maintain the level of realism expected of such immersive simulation (e.g., between 5 and 60 images rendered per second or a maximum rendering time ranging between 15 ms and 200 ms for each rendered image). In some embodiments, each of the simulation stations 1200, 1300 comprises a processor module similar to the processor module 1130 and having a dedicated graphics processing unit similar to the dedicated graphics processing unit 1132. The memory module 1120 may comprise various types of memory (different standardized or kinds of Random-Access Memory (RAM) modules, memory cards, Read-Only Memory (ROM) modules, programmable ROM, etc.). The network interface module 1140 represents at least one physical interface that can be used to communicate with other network nodes. The network interface module 1140 may be made visible to the other modules of the computer system 1000 through one or more logical interfaces. The actual stacks of protocols used by physical network interface(s) and/or logical network interface(s) 1142, 1144, 1146, 1148 of the network interface module 1140 do not affect the teachings of the present invention. The variants of the processor module 1130, memory module 1120 and network interface module 1140 that are usable in the context of the present invention will be readily apparent to persons skilled in the art.

A bus 1170 is depicted as an example of means for exchanging data between the different modules of the computer simulation system 1000. The present invention is not affected by the way the different modules exchange information between them. For instance, the memory module 1120 and the processor module 1130 could be connected by a parallel bus, but could also be connected by a serial connection or involve an intermediate module (not shown) without affecting the teachings of the present invention.

Likewise, even though explicit references to the memory module 1120 and/or the processor module 1130 are not made throughout the description of the various embodiments, persons skilled in the art will readily recognize that such modules are used in conjunction with other modules of the computer simulation system 1000 to perform routine as well as innovative steps related to the present invention.

The interactive computer simulation station 1100 also comprises a Graphical User Interface (GUI) module 1150 comprising one or more display screen(s). The display screens of the GUI module 1150 could be split into one or more flat panels, but could also be a single flat or curved screen visible from an expected user position (not shown) in the interactive computer simulation station 1100. For instance, the GUI module 1150 may comprise one or more mounted projectors for projecting images on a curved refracting screen. The curved refracting screen may be located far enough from the user of the interactive computer program to provide a collimated display. Alternatively, the curved refracting screen may provide a non-collimated display.

Figure 2:
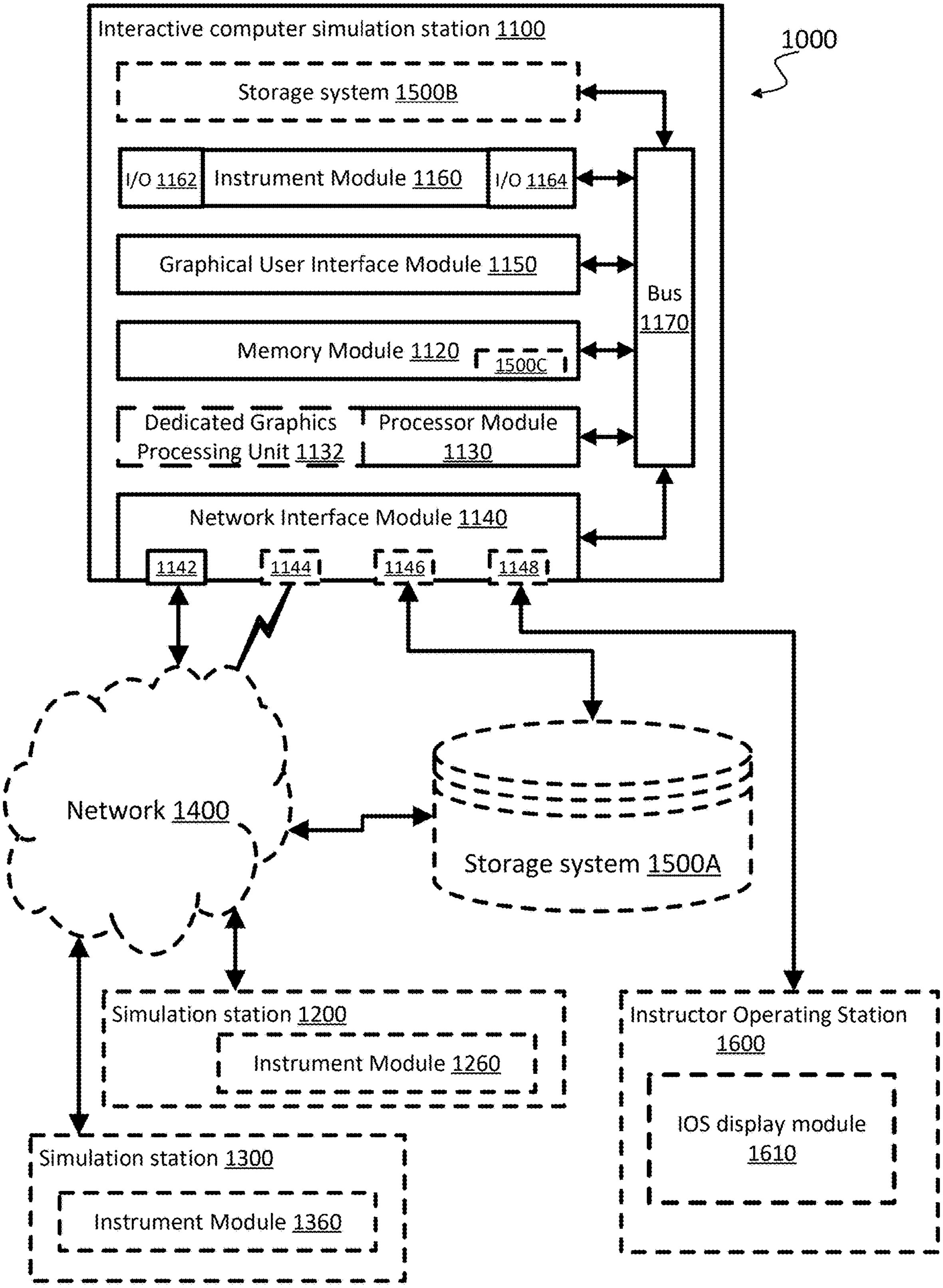
FIG. 2 depicts a simulation system that may be used in the system of FIG. 1.

The computer simulation system 1000 comprises a storage system 1500A-C that may log dynamic data in relation to the dynamic sub-systems while the interactive computer simulation is performed. FIG. 2 shows examples of the storage system 1500A-C as a distinct database system 1500A, a distinct module 1500B of the interactive computer simulation station 1100 or a sub-module 1500C of the memory module 1120 of the interactive computer simulation station 1100. The storage system 1500A-C may also comprise storage modules (not shown) on the interactive computer simulation stations 1200, 1300. The storage system 1500A-C may be distributed over different systems A, B, C and/or the interactive computer simulations stations 1200, 1300 or may be in a single system. The storage system 1500A-C may comprise one or more logical or physical as well as local or remote hard disk drive (HDD) (or an array thereof). The storage system 1500A-C may further comprise a local or remote database made accessible to the interactive computer simulation station 1100 by a standardized or proprietary interface or via the network interface module 1140. The variants of the storage system 1500A-C usable in the context of the present invention will be readily apparent to persons skilled in the art.

An Instructor Operating Station (IOS) 1600 may be provided for allowing various management tasks to be performed in the interactive computer simulation system 1000. The tasks associated with the IOS 1600 allow for control and/or monitoring of one or more ongoing interactive computer simulations. For instance, the IOS 1600 may be used for allowing an instructor to participate in the interactive computer simulation and possibly additional interactive computer simulation(s). In some embodiments, a distinct instance of the IOS 1600 may be provided as part of each one of the interactive computer simulation stations 1100, 1200, 1300. In other embodiments, a distinct instance of the IOS 1600 may be co-located with each one of the interactive computer simulation stations 1100, 1200, 1300 (e.g., within the same room or simulation enclosure) or remote therefrom (e.g., in different rooms or in different locations). Skilled persons will understand that many instances of the IOS 1600 may be concurrently provided in the computer simulation system 1000. The IOS 1600 may provide a computer simulation management interface, which may be displayed on a dedicated IOS display module 1610 or the GUI module 1150. The IOS 1600 may be physically co-located with one or more of the interactive computer simulation stations 1100, 1200, 1300 or it may be situated at a location remote from the one or more interactive computer simulation stations 1100, 1200, 1300.

The IOS display module 1610 may comprise one or more display screens such as a wired or wireless flat screen, a wired or wireless touch-sensitive display, a tablet computer, a portable computer or a smart phone. When multiple interactive computer simulation stations 1100, 1200, 1300 are present in the interactive computer simulation system 1000, the instance of the IOS 1600 may present different views of the computer program management interface (e.g., to manage different aspects therewith) or they may all present the same view thereof. The computer program management interface may be permanently shown on a first of the screens of the IOS display module 1610 while a second of the screen of the IOS display module 1610 shows a view of the interactive computer simulation being presented by one of the interactive computer simulation stations 1100, 1200, 1300). The computer program management interface may also be triggered on the IOS 1600, e.g., by a touch gesture and/or an event in the interactive computer program (e.g., milestone reached, unexpected action from the user, or action outside of expected parameters, success or failure of a certain mission, etc.). The computer program management interface may provide access to settings of the interactive computer simulation and/or of the computer simulation stations 1100, 1200, 1300. A virtualized IOS (not shown) may also be provided to the user on the IOS display module 1610 (e.g., on a main screen, on a secondary screen or a dedicated screen thereof). In some embodiments, a Brief and Debrief System (BDS) may also be provided. In some embodiments, the BDS is a version of the IOS configured to selectively play back data recorded during a simulation session and an analytics dashboard.

The tangible instrument provided by the instrument modules 1160, 1260 and/or 1360 are closely related to the element being simulated. In the example of the simulated aircraft system, for instance, in relation to an exemplary flight simulator embodiment, the instrument module 1160 may comprise a control yoke and/or side stick, rudder pedals, a throttle, a flap switch, a transponder, a landing gear lever, a parking brake switch, and aircraft instruments (air speed indicator, attitude indicator, altimeter, turn coordinator, vertical speed indicator, heading indicator, etc). Depending on the type of simulation (e.g., level of immersivity), the tangible instruments may be more or less realistic compared to those that would be available in an actual aircraft. For instance, the tangible instruments provided by the instrument module(s) 1160, 1260 and/or 1360 may replicate those found in an actual aircraft cockpit or be sufficiently similar to those found in an actual aircraft cockpit for training purposes. As previously described, the user or trainee can control the virtual representation of the simulated interactive object in the interactive computer simulation by operating the tangible instruments provided by the instrument modules 1160, 1260 and/or 1360. In the context of an immersive simulation being performed in the computer simulation system 1000, the instrument module(s) 1160, 1260 and/or 1360 would typically replicate an instrument panel found in the actual interactive object being simulated. In such an immersive simulation, the dedicated graphics processing unit 1132 would also typically be required. While the present invention is applicable to immersive simulations (e.g., flight simulators certified for commercial pilot training and/or military pilot training), skilled persons will readily recognize and be able to apply its teachings to other types of interactive computer simulations.

In some embodiments, an optional external input/output (I/O) module 1162 and/or an optional internal input/output (I/O) module 1164 may be provided with the instrument module 1160. Skilled people will understand that any of the instrument modules 1160, 1260 and/or 1360 may be provided with one or both of the I/O modules 1162, 1164 such as the ones depicted for the computer simulation station 1100. The external input/output (I/O) module 1162 of the instrument module(s) 1160, 1260 and/or 1360 may connect one or more external tangible instruments (not shown) therethrough. The external I/O module 1162 may be required, for instance, for interfacing the computer simulation station 1100 with one or more tangible instruments identical to an Original Equipment Manufacturer (OEM) part that cannot be integrated into the computer simulation station 1100 and/or the computer simulation station(s) 1200, 1300 (e.g., a tangible instrument exactly as the one that would be found in the interactive object being simulated).

The internal input/output (I/O) module 1162 of the instrument module(s) 1160, 1260 and/or 1360 may connect one or more tangible instruments integrated with the instrument module(s) 1160, 1260 and/or 1360. The I/O module 1162 may comprise necessary interface(s) to exchange data, set data or get data from such integrated tangible instruments. The internal I/O module 1162 may be required, for instance, for interfacing the computer simulation station 1100 with one or more integrated tangible instruments that are identical to an Original Equipment Manufacturer (OEM) part that would be found in the interactive object being simulated. The I/O module 1162 may comprise necessary interface(s) to exchange data, set data or get data from such integrated tangible instruments.

The instrument module 1160 may comprise one or more tangible instrumentation components or subassemblies that may be assembled or joined together to provide a particular configuration of instrumentation within the computer simulation station 1100. As can be readily understood, the tangible instruments of the instrument module 1160 are configured to capture input commands in response to being physically operated by the user of the computer simulation station 1100.

The instrument module 1160 may also comprise a mechanical instrument actuator 1166 providing one or more mechanical assemblies for physical moving one or more of the tangible instruments of the instrument module 1160 (e.g., electric motors, mechanical dampeners, gears, levers, etc.). The mechanical instrument actuator 1166 may receive one or more sets of instruments (e.g., from the processor module 1130) for causing one or more of the instruments to move in accordance with a defined input function. The mechanical instrument actuator 1166 of the instrument module 1160 may alternatively, or additionally, be used for providing feedback to the user of the interactive computer simulation through tangible and/or simulated instrument(s) (e.g., touch screens, or replicated elements of an aircraft cockpit or of an operating room). Additional feedback devices may be provided with the computing device 1110 or in the computer system 1000 (e.g., vibration of an instrument, physical movement of a seat of the user and/or physical movement of the whole system, etc.).

The interactive computer simulation station 1100 may also comprise one or more seats (not shown) or other ergonomically designed tools (not shown) to assist the user of the interactive computer simulation in getting into proper position to gain access to some or all of the instrument module 1160.

In the depicted example of FIG. 2, the interactive computer simulation station 1100 shows optional additional interactive computer simulation stations 1200, 1300, which may communicate through the network 1400 with the simulation computing device. The interactive computer simulation stations 1200, 1300 may be associated to the same instance of the interactive computer simulation with a shared computer-generated environment where users of the interactive computer simulation stations 1100, 1200, 1300 may interact with one another in a single simulation. The single simulation may also involve other interactive computer simulation stations (not shown) co-located with the interactive computer simulation stations 1100, 1200, 1300 or remote therefrom. The interactive computer simulation stations 1200, 1300 may also be associated with different instances of the interactive computer simulation, which may further involve other computer simulation stations (not shown) co-located with the interactive computer simulation station 1100 or remote therefrom.

In the context of the depicted embodiments, runtime execution, real-time execution or real-time priority processing execution corresponds to operations executed during the interactive computer simulation that may have an impact on the perceived quality of the interactive computer simulation from a user perspective. An operation performed at runtime, in real time or using real-time priority processing thus typically needs to meet certain performance constraints that may be expressed, for instance, in terms of maximum time, maximum number of frames, and/or maximum number of processing cycles. For instance, in an interactive simulation having a frame rate of 60 frames per second, it is expected that a modification performed within 5 to 10 frames will appear seamless to the user. Skilled persons will readily recognize that real-time processing may not actually be achievable in absolutely all circumstances in which rendering images is required. The real-time priority processing required for the purpose of the disclosed embodiments relates to the perceived quality of service by the user of the interactive computer simulation and does not require absolute real-time processing of all dynamic events, even if the user was to perceive a certain level of deterioration in the quality of the service that would still be considered plausible.

A simulation network (e.g., overlaid on the network 1400) may be used, at runtime (e.g., using real-time priority processing or processing priority that the user perceives as real-time), to exchange information (e.g., event-related simulation information). For instance, movements of a vehicle associated with the computer simulation station 1100 and events related to interactions of a user of the computer simulation station 1100 with the interactive computer-generated environment may be shared through the simulation network. Likewise, simulation-wide events (e.g., related to persistent modifications to the interactive computer-generated environment, lighting conditions, modified simulated weather, etc.) may be shared through the simulation network from a centralized computer system (not shown). In addition, the storage module 1500A-C (e.g., a networked database system) accessible to all components of the computer simulation system 1000 involved in the interactive computer simulation may be used to store data necessary for rendering the interactive computer-generated environment. In some embodiments, the storage module 1500A-C is only updated from the centralized computer system and the computer simulation stations 1200, 1300 only load data therefrom.

The computer simulation system 1000 of FIG. 2 may be used to simulate the operation by a user of a user vehicle. For example, in a flight simulator, the interactive computer simulation system 1000 may be used to simulate the flying of an aircraft by a user acting as the pilot of the simulated aircraft. In a battlefield simulator, the simulator may simulate a user controlling one or more user vehicles such as airplanes, helicopters, warships, tanks, armored personnel carriers, etc.

Returning now to FIG. 1, the system 100 may optionally include an adaptive learning AI module (adaptive training module) 160 to adapt training of a student in response to the hybrid assessment. As shown by way example in FIG. 1, the adaptive learning AI module 160 receives the hybrid assessment 152 and then adapts the training of the student based on the student performance as reflected in the hybrid assessment 152.

The adaptive learning AI module 160 optionally includes various modules that will now be described. The adaptive learning AI module may optionally include a learner profile module 164 that profiles the student to generate an AI-generated learner profile of the student and a training task recommendation module 170 that generates AI-generated recommendations that recommend one or more training tasks for the student based on the student performance. The adaptive learning AI module 160 optionally includes an explainability and pedagogical intervention module 174 in data communication with the learner profile module and the training task recommendation module and also in data communication with an instructor computing device 180 for providing to an instructor explanations for the AI-generated recommendations. Optionally, the explainability and pedagogical intervention module 174 is configured to provide an instructor user interface to enable the instructor to intervene to modify the AI-generated recommendations. The recommendations may include suggested types of training tasks to be undertaken and also the suggested types of information to be conveyed. These types of training tasks and information may be modified by the instructor via the instructor computing device.

In the embodiment depicted by way of example in FIG. 1, the explainability and pedagogical intervention module 174 may receive input data from a variety of sources in order to provide explanations for the AI-based decisions and recommendations made by the various components of the adaptive learning AI module 160. In the specific context of flight training, an AI Pilot Performance Assessment module 162 may provide to the explainability and pedagogical intervention module 174 data on learning trends and progress metrics broken down by cohort, student, and competency (e.g. ICAO competencies) in absolute numbers or in relation to training curricula and/or metrics of an average population. From the training task recommendation module 170 may be received data related to predictions of future performance, risks of failure, and recommendation(s) as to the next training task(s). From the learner profile module 164 may be received a student-specific profile in the form of a listing of clusters to which the student belongs, the clusters reflecting learning styles and preferences. Furthermore, the explainability and pedagogical intervention module 174 may optionally receive data from the student and instructor dashboards 182, 184. This data may contain recommendations for an optimal sequence of learning activities on a learning platform (e.g. an academic lesson/training session on VR-based simulator/training session on a full flight simulator). Furthermore, the explainability and pedagogical intervention module 174 may also receive data from the individualized micro-learning path module 172 such as data related to micro-learning activities. Finally, the explainability and pedagogical intervention module 174 may be in data communication with the instructor computing device 180 to enable the instructor 110 or director of training 111 to communicate with the adaptive learning AI module 160 to implement new policies, change rules and/or perform manual overrides.

In the embodiment of FIG. 1, the explainability and pedagogical intervention module 174 optionally outputs data to the student and instructor dashboards 182, 184 and learning workflow optimization module 166. This output data may include justifications, reasons, explanations, or the like for the AI-generated recommendations that are generated by any one or more of the training task recommendation module 170, the learning workflow optimization module 166, and the individualized micro-learning path module 172.

The explainability and pedagogical intervention module 174 provides detailed information on the AI-generated recommendations and may also provide information on the potential impact of the recommendations to the training program individually and globally. For example, an instructor may question the value, reasoning, rationale or assumptions for these AI-generated recommendations. Students, instructors and training directors alike can interact with the explainability and intervention pedagogical module 174 to gain a deeper understanding of, or insight into, the AI-generated recommendations, thereby enabling them to more fully trust the AI-generation recommendations. In this embodiment, an instructor has the ability to intervene and modify the default sequence of lessons in the training program and/or to modify the AI-generated recommendations, through an instructional intervention tool. With data and performance visualization, the explainability and pedagogical intervention module 174 reinforces the other modules iteratively with user input, whether it is the student making learning requests or the instructor applying instructional interventions. For example, an instructor may seek to speed up a particular student's learning so that the student can keep pace with his or her classmates. Interventions may be made not only for pedagogical or educational reasons but also for compliance with new or changing safety requirements in flight operations.

In one embodiment, the recommendations provided by the explainability and pedagogical intervention module 174 enable an instructor to intervene to prescribe training tasks and/or theoretical learning. The instructor interventions may be used by the adaptive learning AI module to adjust further recommendations.

As depicted in FIG. 1, the adaptive learning AI module 160 optionally includes an adaptive learning user portal integration module 176 to provide a data interface with a student dashboard 182 that is displayed on a student computing device to a student. The adaptive learning user portal integration module 176 also provides a data interface to an instructor dashboard 184 displayed on an instructor computing device 180 to an instructor 110. Optionally, the instructor dashboard 184 may be modified or reconfigured to present information to a director of flight training (DFT) 111.

The adaptive learning AI module 160 may optionally be configured to recommend individualized learning paths based on the student's performance and preference (selected by the student or inferred from performance metrics) in several learning environments, such as academic/theoretical coursework and exams, simulator training and real flights. The adaptive learning AI module 160 recommends additional study materials and course paths. The adaptive learning AI module 160 also gathers the course curriculum which allows the adaptive learning AI module 160 to recommend for the student an individualized learning path through lessons and maneuvers. The adaptive learning AI module 160 may be configured to make recommendations based on the student performance. The adaptive learning AI module 160 can increase or decrease the difficulty of a training task based on student performance metrics. For example, if the adaptive learning AI module 160 determines that a student is having difficulty with a particular type of task, the adaptive learning AI module 160 may recommend remedial training in that particular task. For example, if the student is having trouble performing a particular airborne maneuver in a simulator, the adaptive learning AI module 160 may recommend that the student do remedial theoretical study and then return to the simulator for additional practice on the simulator doing that particular maneuver.

Optionally, the adaptive learning AI module 160 includes an AI student performance assessment module 162. The AI student performance assessment module 162 receives input data in the form of performance history data for students across diverse training environments. The AI student performance assessment module 162 outputs data to all modules of the adaptive learning AI module 160 and to the student and instructor dashboards 182, 184. The data output by the AI student performance assessment module 162 may include learning trends and progress metrics broken down by cohort, student, and competency (e.g. ICAO competencies in the specific context of flight training) in raw or absolute numbers and also in relation to training curricula and metrics of an average population of students of which the student being assessed is a member.

The AI student performance assessment module 162, in one embodiment, provides learning status within the training program and allows students to view their own progress through the program. Instructors can also view the learning path for different groups of pilots. For a training manager, this could be a useful indicator of how well the training program trains pilots. The overall assessment is based on the eight ICAO competencies which serves as the basis for micro-learning recommendations to increase the capacity of specific skills.

The AI student performance assessment module 162, in one embodiment, takes into account automated performance assessments generated by the Virtual Instructor Module 120, which is configured to provide real-time assistance to instructors during simulation training based on the flight telemetries, which assistance can be in the form of audio recommendations based on flight status and performance.

As introduced above, the adaptive learning AI module (ALAI) 160 includes a learner profile module 164 whose function it is to profile the student based on the student's performance metrics in the diverse learning ecosystem and also optionally based on psychometric test data indicative of the psychometric characteristics of the student. The learner profile module 164 receives its data from the data lake 130. The data received by the learner profile module 164 may include student-specific learning data in the form of performance and telemetries related to training sessions, performance and behavior related to learning sessions, overall flight history, personality traits, and demographics. The learner profile module 164 outputs data to all other modules of the adaptive learning AI module 160 (except the AI Pilot Performance Assessment Module 162). The data output by the learner profile module 164 may include student-specific profile data in the form of a listing of clusters to which the student belongs, the clusters reflecting learning styles and preferences. The learner profile module 164 provides a complete portrait of the student. The pilot grouping (clustering) involves identifying the models of performance and learning behavior. This learner profile module 164 therefore applies a segmentation of students into performance and preference categories (groups or clusters). Students are grouped into categories based on their performance, which indicates where a student stands in relation to others. By associating a student with a cluster or group, the ALAI module 160 can adapt the training for the student to provide a more effective and efficiency learning experience through the training program. In other words, learner profile module 164 enables the ALAI module 160 to tailor (i.e. adapt, individualize, personalize or customize) a training approach or style for each particular student.

As introduced above, the optional learning workflow optimization module 166 receives data from a plurality of sources. The learning workflow optimization module 166 may receive data in the form of training content data such as a content metadata, learning objectives, curricula and courses. The learning workflow optimization module 166 may also receive data from the AI Pilot Performance Assessment module 162 in the form of learning trends and progress metrics broken down optionally by cohort, student, and competency (e.g. ICAO competencies) in absolute numbers or in relation to training curricula and/or metrics of an average population of students. The learning workflow optimization module 166 may receive data from a training task recommendation module 170 in the form of a prediction of future performance, risks of failure, and recommendation(s) as to the next training task(s). The learning workflow optimization module 166 may receive data from the learner profile module 164 in the form of a student-specific profile that includes a listing of clusters to which the student belongs, the clusters reflecting learning styles and preferences. The learning workflow optimization module 166 may receive data that includes training center operational parameters (e.g. operation costs, schedule, location, and availability of human and material resources). The learning workflow optimization module 166 outputs data to the student and instructor dashboards 182, 184. This output data includes recommendations for an optimal sequence of learning activities on a learning platform (e.g. an academic lesson/training session on VR-based simulator/training session on a full flight simulator).

The learning workflow optimization module 166 makes it possible to recommend a progressive sequence of activities in the pilot training program in order to optimize, or at least greatly improve the efficiency and efficacy of, the learning path. The optimized sequence is based on the historical activity performance of the individual pilot (student) and on the optimal path. The optimization of the AI learning workflow provides an optimized sequence recommendation of lessons in the program to complete it more efficiently. The learning workflow optimization module 166 provides a list of optimal learning flows using hybrid analysis and an AI-driven approach based on the training task recommendation module 170. It separates students from an optimized course, a standard course, and a remedial course. The learning workflow optimization module 166 shows predictive completion or transition dates for a cohort. The learning workflow optimization module 166 is also optionally configured to analyze trainer-led lesson scores to indicate which areas need improvement or are working well. The learning workflow optimization module 166 is also optionally configured to identify delays in a student's progress and shows predictive completion dates. Optionally, the adaptive learning AI module 160 includes a remedial training module 168 to receive performance data and to recommend remedial training based on gaps in the knowledge, skills and aptitudes of the student. The remedial training module 168 may cooperate with, or be integrated with, the learning workflow optimization module 166. Optionally, the learning workflow optimization module may furthermore optimize resources of the training center based on factors such as training cost and training time as well as machine and simulator availability. For example, the cost of a learning path may be taken into consideration. For example, the recommendations may take into account actual aircraft training time and cost as opposed to simulator training time and cost. Availability of aircraft and/or simulators also are constraints in the learning optimization module. In other words, in this embodiment, the system allocates limited resources in an efficient manner to provide optimized training to the students.

The recommendations generated by the learning workflow optimization module 166 can also optimize learning environments by varying the sequence or relative proportions of the theoretical courses, simulation time, and actual in-plane flying. Effective completion of the program should consider not only time to completion but also the overall knowledge, skill and aptitude of the student at the end of the course.

Optionally, the adaptive learning AI module 160 includes an individualized micro learning path module 172. The data received by the individualized micro learning path module 172 derives from the AI Pilot Performance Assessment module and the learner profile. From the LRS, the individualized micro learning path module 172 receives training content data in the form of, for example, content metadata, learning objectives, curricula, and courses. From the AI Pilot Performance Assessment module, the individualized micro learning path module 172 receives, for example, learning trends and progress metrics broken down by cohort, student, and competency (e.g. ICAO competencies) in absolute number or in relation to a training curriculum and/or metrics of an average population of students. From the learner profile module, the individualized micro learning path module 172 receives a student-specific profile in the form of, for example, a listing of clusters to which the student belongs, the clusters reflecting learning styles and preferences. The individualized micro learning path module 172 outputs data to the student and instructor dashboards 182, 184. The data output may include micro-learning activities (e.g. viewing a two-minute video addressing a particular pedagogical need or KSA gap).

The individualized micro-learning path module 172 may, for example, focus on a specific learning objective. For example, based on performance metric and KSA gap, this individualized micro-learning path module 172 suggests short courses, seminars short videos, or concise reading material that can be taken out of sequence to address a specific KSA gap. This individualized micro-learning path module 172 adapts the method of delivering training to better suit the learner by recommending pointed and focused course material to maximize the success of the training. This individualized micro-learning path module 172 can also be used by instructional designers to help them decide what micro-learning content to create and how effective it is. The training task recommendation module 170 could be extended to cooperate with the individualized micro-learning path module 172 to make recommendations on micro-learning content during the program.

Figure 3A:
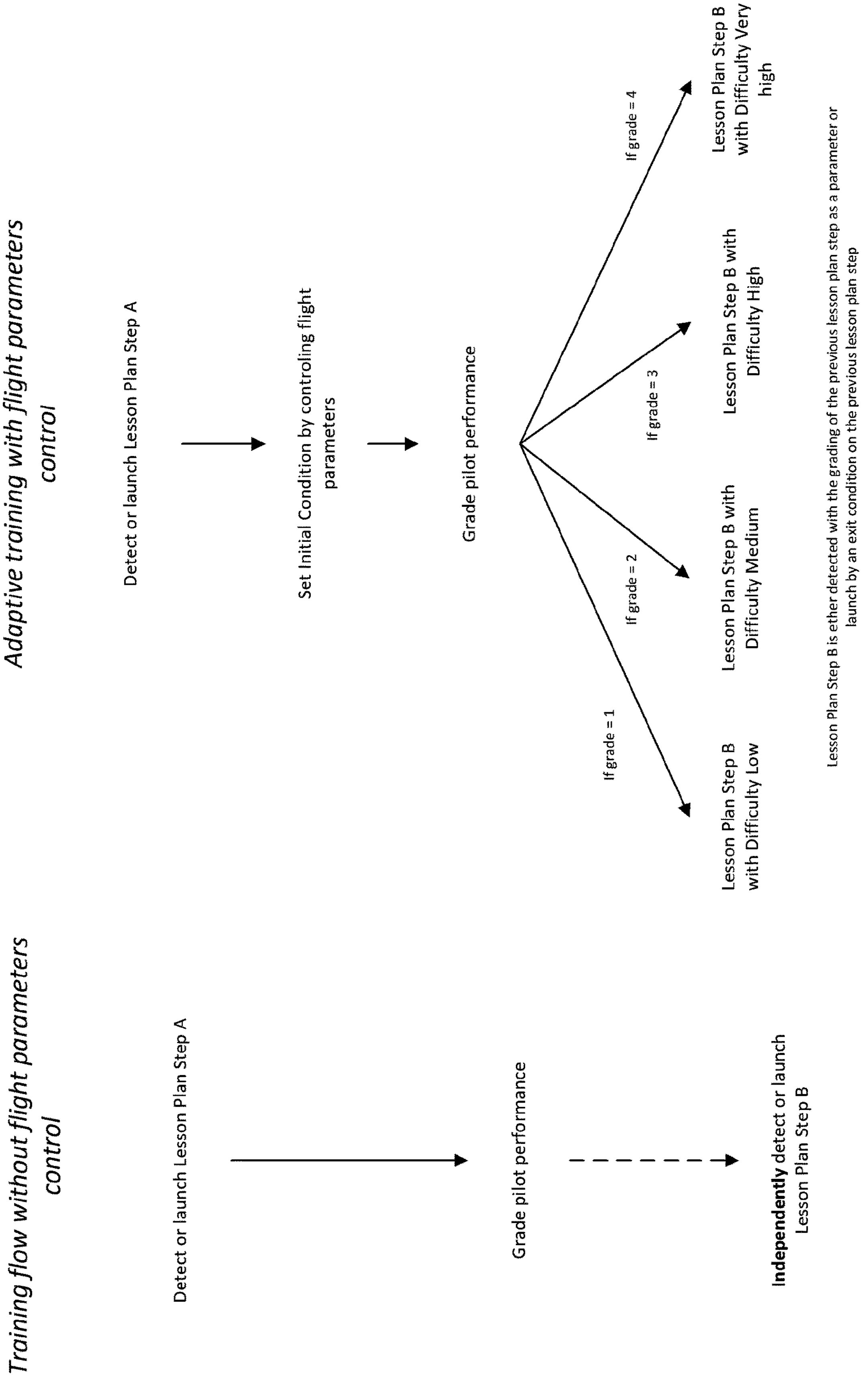
FIG. 3A depicts a deterministic approach to adapt training.
Figure 3B:
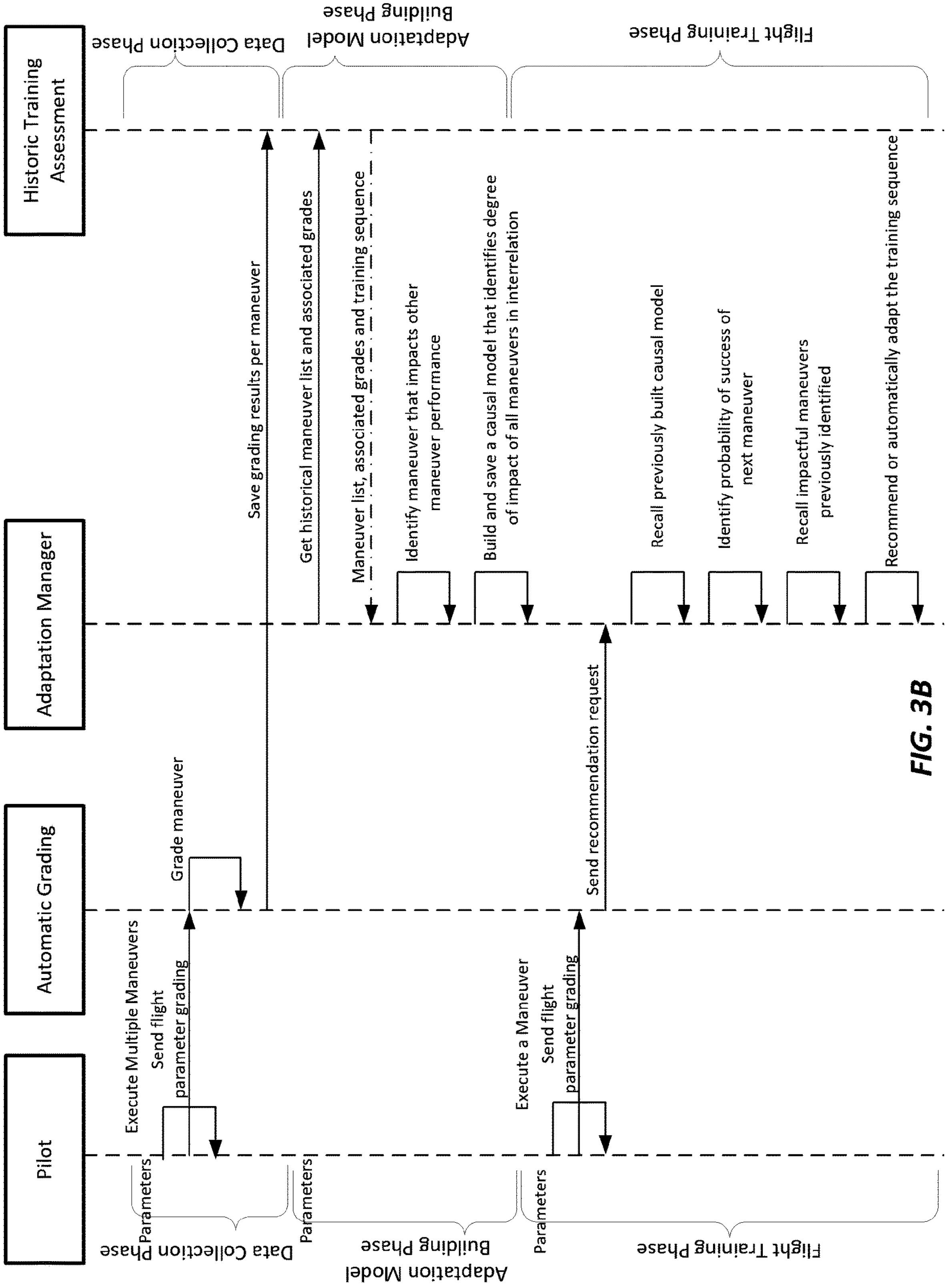
FIG. 3B depicts a probabilistic approach to adapt training.

In addition to the foregoing modules and capabilities, the adaptive learning AI module 160 may be configured to adapt the training deterministically and/or probabilistically as depicted schematically in FIG. 3A and FIG. 3B.

Adapting the training deterministically is accomplished by prescribing a predetermined lesson for each one of a plurality of different grade outcomes. For example, if the student is awarded a grade of A, B, C, D or F, the adaptive learning AI module assigns lesson 1, 2, 3, 4 or 5 respectively. Once the student completes the assigned lesson (one of lessons 1, 2, 3, 4, 5), the adaptive learning AI module assigns another lesson based on the grade obtained in the last lesson. In other words, the deterministic approach to adapting training to the student may be accomplished by setting up a lesson plan having a different path for every grade obtained at every step of the lesson plan. FIG. 3A schematically depicts a deterministic approach to adapt training. In the example of FIG. 3A, the first step (denoted step A) of the lesson plan is graded. Four grade outcomes are possible. Each grade outcome is assigned a different next step in the lesson plan (denoted step B).

FIG. 3B depicts schematically a probabilistic approach to adapt training. Adapting the training probabilistically is accomplished by predicting the probability or likelihood of the student succeeding at a future lesson by considering the past or historical performance of the student. Using historical data, a graph may be constructed using a probabilistic algorithm such as Bayesian Network, Markov Chain or another machine learning algorithm to adapt the training for a particular student based on the previous performance of other students. Each node of the graph can predict a probability of success of next nodes based on current performance and historical performance and then orient or organize the training sequence to ensure that the student will be trained in an optimized, or at least nearly optimized, sequence of lessons. A plurality of graphs may also be used in another embodiment. A clustering technique may be used to identify a group of learning behaviors that can be used by the adaptive learning AI module 160 to predict probabilistic outcomes. In one implementation, the adaptive learning AI module 160 can also adapt the current lesson in real-time by increasing or decreasing its difficulty, complexity, etc. The adaptive learning AI module 160 may make these adaptations automatically. In a variant, the adaptive learning AI module 160 may notify the instructor of the adaptation being made and/or request approval from the instructor before implementing the adaptation. In another variant, the adaptive learning AI module 160 may make a recommendation to the instructor to change a lesson plan.

In one embodiment, a hybrid combination of deterministic and probabilistic approaches may be used to achieve particularly good outcomes. In this hybrid implementation, the adaptive learning AI module is configured to adapt the lesson plan by: (i) generating a deterministic lesson plan that prescribes a particular lesson for each grade or grade range that the student has achieved as determined by the hybrid performance assessment; (ii) generating a probabilistic lesson plan based on a probability of succeeding at future lessons based on historical performance of the student; and (iii) combining the deterministic lesson plan and the probabilistic lesson plan to create a hybrid deterministic-probabilistic lesson plan that optimizes an order of the future lessons in the probabilistic lesson plan while also ensuring that every lesson in the deterministic lesson plan is taken.

Figure 4:
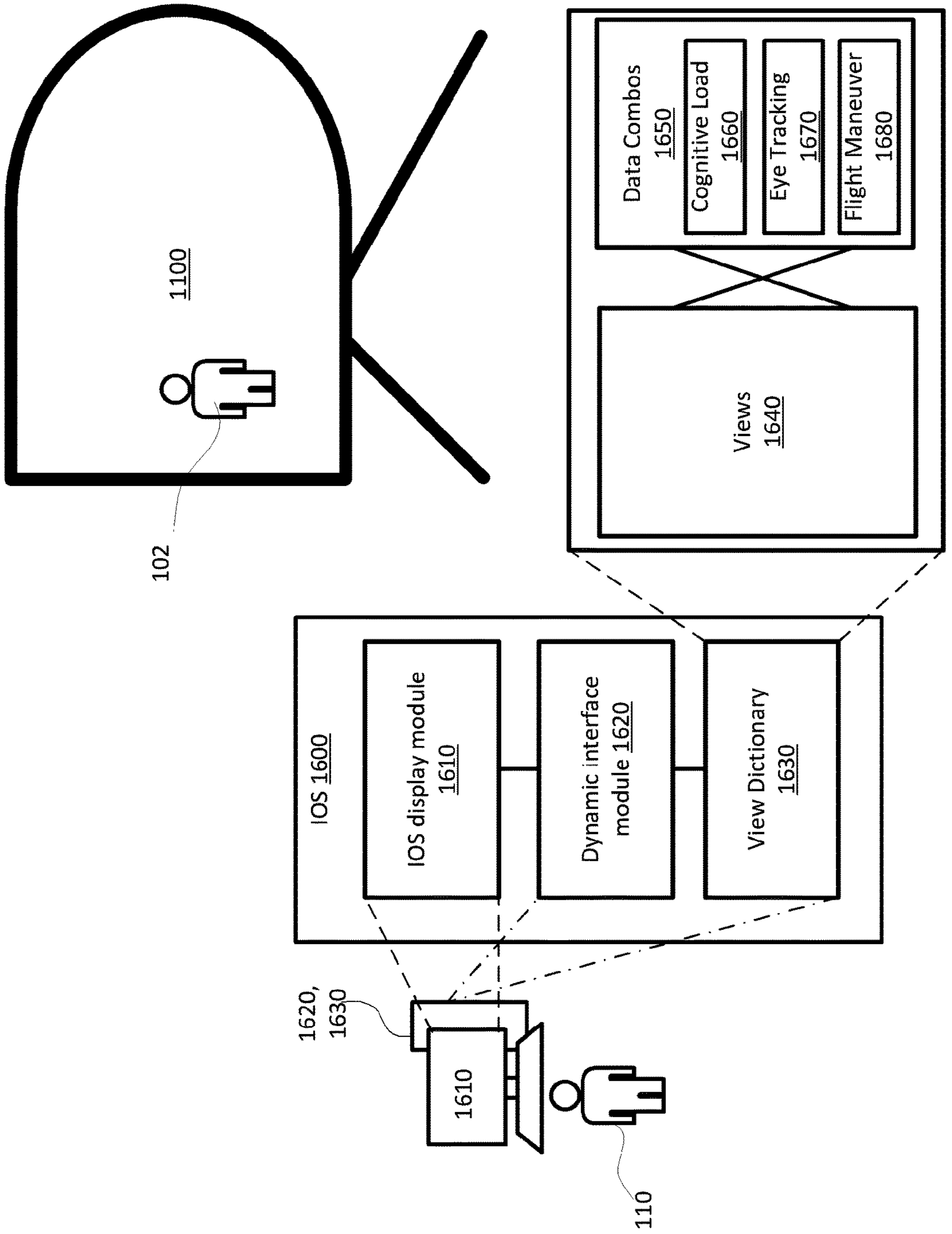
FIG. 4 depicts a dynamic instructor interface that adapts to the performance of the student.

In the embodiment depicted by way of example in FIG. 4, the instructor operating station 1600 comprises a dynamic instructor interface (IOS display module 1610 of FIG. 2) and a dynamic interface module 1620 for controlling an instructor interface view (i.e. the graphical content) presented by the dynamic instructor interface. The dynamic interface module 1620 dynamically adapts the dynamic instructor interface 1610 in response to the performance of the student. In one embodiment, the dynamic interface module 1620 has an intelligent view adapter dictionary 1630 that maps a plurality of different instructor interface views 1640 to respective combinations 1650 of student performance data. The student performance data 1650 may include: (i) cognitive workload data 1660 indicative of a psychophysiological state of the student, (ii) eye-tracking data 1670 indicative of the gaze of the student; and (iii) flight maneuver data 1680.

Figure 5:
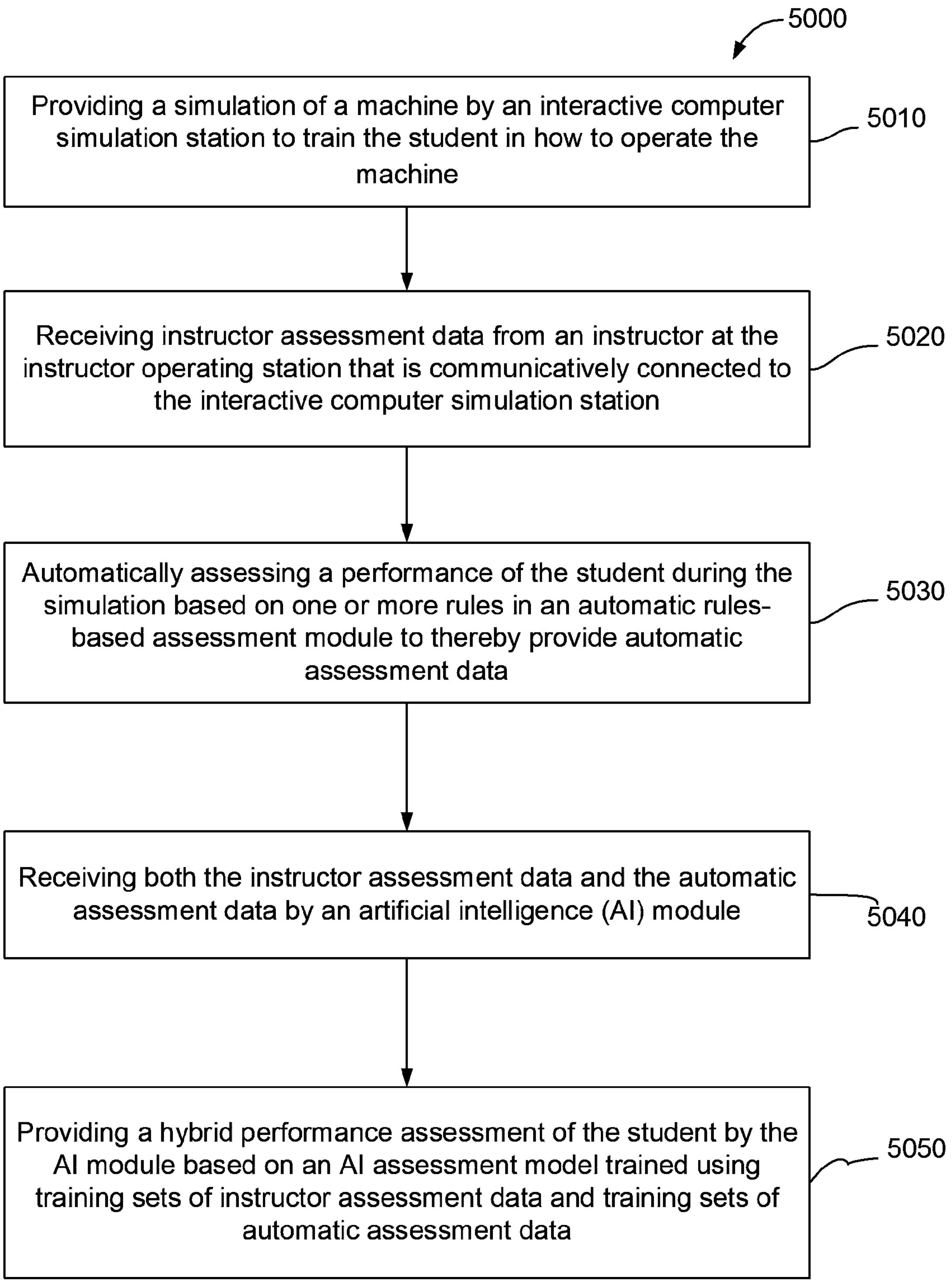
FIG. 5 is a flowchart of a method of assessing performance in accordance with an embodiment of the present invention.

Another aspect of the invention is a computer-implemented method of assessing performance. The method is presented in the flowchart of FIG. 5. As depicted in FIG. 5, the method 5000 entails a step, act or operation 5010 of providing a simulation of a machine. This is accomplished by providing an interactive computer simulation station (such as the interactive computer simulation station 1100 shown in FIG. 2) that presents an immersive simulation to a student or trainee in order to train the student or trainee in how to operate the machine. For example, the simulation station may be a flight simulator for training a student pilot in how to fly an aircraft. It will be appreciated that the simulator may simulate other vehicles (e.g. land vehicles, ships, submarines, spacecraft, etc.) or non-vehicular machines (e.g. power stations or other complex industrial equipment). The method 5000 entails a step 5020 of receiving instructor assessment data from an instructor at the instructor operating station that is communicatively connected to the interactive computer simulation station. The method 5000 entails a step 5030 of automatically assessing a performance of the student during the simulation based on one or more rules in an automatic rules-based assessment module to thereby provide automatic assessment data. The method 5000 entails a step 5040 of receiving both the instructor assessment data and the automatic assessment data by an artificial intelligence (AI) module. The method 5000 further entails a step 5050 of providing a hybrid performance assessment of the student by the AI module based on an AI assessment model trained using training sets of instructor assessment data and training sets of automatic assessment data.

Figure 6:
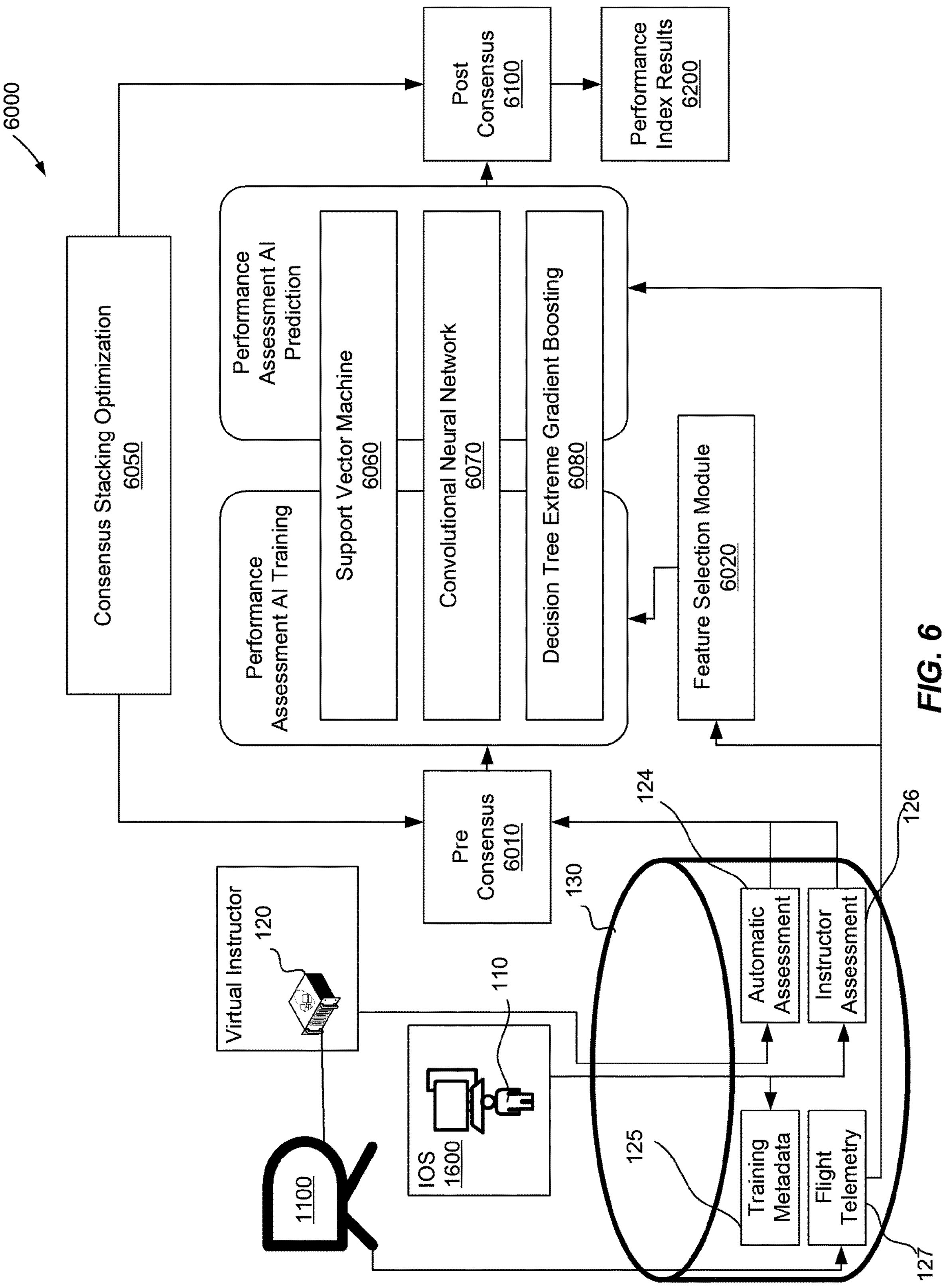
FIG. 6 depicts one implementation of an AI assessment module that employs different machine learning algorithms.

FIG. 6 depicts a system 6000 having an AI assessment module in accordance with another embodiment. In this example implementation, the AI assessment module employs different machine learning algorithms. In one embodiment, the AI assessment module constitutes, or is part of, the ALAI module 160 described above. This AI assessment module can be used to perform the above method of assessing performance of a student using both (i) automatic rules-based assessment data 124 in the data lake 130 or stored in an automatic rules-based assessment data storage separate from the data lake 130 and (ii) instructor assessment data 126 in the data lake or stored in an instructor assessment data storage separate from the data lake. The instructor assessment data 126 is received from grading input received from the instructor 110 at the IOS 1600 while the student is training on the simulator in the simulation station 1100. The instructor 110 is a human instructor in this embodiment. Training metadata 125 is also received from the IOS 1600. The virtual instructor 120 is an expert computer system or computer-readable medium that automatically assesses the performance of the student by applying rules to compare flight telemetry 127 with prescribed norms or benchmarks to generate the automatic assessment data 124. A pre-consensus module 6010 receives the instructor assessment data 126 and the automatic assessment data 124 and seeks to correlate the instructor assessment data 126 and the automatic assessment data 124. A feature selection module 6020 is configured to select features for training the AI assessment model. Training is accomplished using one or more of various training algorithms. In one embodiment, the method includes a step of generating (training) the AI assessment model by developing a consensus among a plurality of different grading models. In one embodiment, the different grading models include, or are selected from a group consisting of, a support vector machine model 6060, a convolutional neural network model 6070 and a decision tree extreme gradient boosting model 6080. A consensus stacking optimization module 6050 seeks to optimize a consensus among the algorithms by combining the results from different algorithms to provide a consensus assessment model that is more accurate and explainable than a model generated using only a single algorithm. The post consensus module 6100 receives and applies the consensus assessment model i.e. the AI assessment model to be used for predicting performance. The AI assessment model is then used by a performance index results module 6200 to assess performance of a student during simulation training to provide performance indices (i.e. AI-determined grading of the student performance). The AI assessment model 150 may be used in the system 100 of FIG. 1

In one embodiment, the method involves the AI module communicating with the automatic rules-based assessment module to adjust one or more of the rules of the automatic rules-based assessment module in response to detecting a grading discrepancy with the AI assessment model.

In one embodiment, the method involves the AI module communicating with the instructor operating station to display grading feedback to the instructor in response to detecting a grading discrepancy with the AI assessment model.

In one embodiment, the method involves adapting a current training lesson and/or a lesson plan by an adaptive learning AI module in response to detecting that the hybrid performance assessment of the student falls below a predetermined threshold. In one implementation, adapting of the lesson plan is performed by: (i) generating a deterministic lesson plan that prescribes a particular lesson for each grade or grade range that the student has achieved as determined by the hybrid performance assessment; (ii) generating a probabilistic lesson plan based on a probability of succeeding at future lessons based on historical performance of the student; and (iii) combining the deterministic lesson plan and the probabilistic lesson plan to create a hybrid deterministic-probabilistic lesson plan that optimizes an order of the future lessons in the probabilistic lesson plan while also ensuring that every lesson in the deterministic lesson plan is taken.

In one embodiment, the method entails a step of controlling an instructor interface view presented by a dynamic instructor interface of the instructor operating station by adapting the dynamic instructor interface in response to the performance of the student. In one implementation, controlling the instructor interface view comprises using an intelligent view adapter dictionary to map a plurality of different instructor interface views to respective combinations of student performance data, wherein the student performance data includes: (i) cognitive workload data indicative of a psychophysiological state of the student, (ii) eye-tracking data indicative of the gaze of the student; and (iii) flight maneuver data.

These methods can be implemented in hardware, software, firmware or as any suitable combination thereof. That is, if implemented as software, the computer-readable medium comprises instructions in code which when loaded into memory and executed on a processor of a computing device causes the computing device to perform any of the foregoing method steps. These method steps may be implemented as software, i.e. as coded instructions stored on a computer readable medium which performs the foregoing steps when the computer readable medium is loaded into memory and executed by the microprocessor of the computing device. A computer readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc. For the purposes of this specification, the expression "module" is used expansively to mean any software, hardware, firmware, or combination thereof that performs a particular task, operation, function or a plurality of related tasks, operations or functions. When used in the context of software, the module may be a complete (standalone) piece of software, a software component, or a part of software having one or more routines or a subset of code that performs a discrete task, operation or function or a plurality or related tasks, operations or functions. Software modules have program code (machine-readable code) that may be stored in one or more memories on one or more discrete computing devices. The software modules may be executed by the same processor or by discrete processors of the same or different computing devices.

For the purposes of interpreting this specification, when referring to elements of various embodiments of the present invention, the articles "a", "an", "the" and "said" are intended to mean that there are one or more of the elements. The terms "comprising", "including", "having", "entailing" and "involving", and verb tense variants thereof, are intended to be inclusive and open-ended by which it is meant that there may be additional elements other than the listed elements.

This invention has been described in terms of specific implementations and configurations which are intended to be exemplary only. Persons of ordinary skill in the art will appreciate that many obvious variations, refinements and modifications may be made without departing from the inventive concepts presented in this application. The scope of the exclusive right sought by the Applicant(s) is therefore intended to be limited solely by the appended claims.

The invention claimed is:

1. A computerized system for assessing performance, the system comprising:

an interactive computer simulation station for providing a simulation of a machine to train a student in how to operate the machine;

an instructor operating station communicatively connected to the interactive computer simulation station to receive instructor assessment data from an instructor at the instructor operating station;

an automatic rules-based assessment module for automatically assessing a performance of the student during the simulation based on one or more rules to thereby provide automatic assessment data; and an artificial intelligence (AI) module for receiving both the instructor assessment data and the automatic assessment data and for providing a hybrid performance assessment of the student based on an AI assessment model trained using training sets of instructor assessment data and training sets of automatic assessment data.

2. The system of claim 1 wherein the AI assessment model is generated by developing a consensus among a plurality of different grading models.

3. The system of claim 2 wherein the different grading models include a support vector machine model, a convolutional neural network model and a decision tree extreme gradient boosting model.

4. The system of claim 1 wherein the AI module communicates with the automatic rules-based assessment module to adjust one or more of the rules of the automatic rules-based assessment module in response to detecting a grading discrepancy with the AI assessment model.

5. The system of claim 1 wherein the AI module communicates with the instructor operating station to display grading feedback to the instructor in response to detecting a grading discrepancy with the AI assessment model.

6. The system of claim 1 comprising an adaptive learning AI module for adapting a current training lesson and/or a lesson plan in response to detecting that the hybrid performance assessment of the student falls below a predetermined threshold.

7. The system of claim 6 wherein the adaptive learning AI module is configured to adapt the lesson plan by:

generating a deterministic lesson plan that prescribes a particular lesson for each grade or grade range that the student has achieved as determined by the hybrid performance assessment;

generating a probabilistic lesson plan based on a probability of succeeding at future lessons based on historical performance of the student; and combining the deterministic lesson plan and the probabilistic lesson plan to create a hybrid deterministic-probabilistic lesson plan that optimizes an order of the future lessons in the probabilistic lesson plan while also ensuring that every lesson in the deterministic lesson plan is taken.

8. The system of claim 1 wherein the instructor operating station comprises a dynamic instructor interface and a dynamic interface module for controlling an instructor interface view presented by the dynamic instructor interface, wherein the dynamic interface module dynamically adapts the dynamic instructor interface in response to the performance of the student.

9. The system of claim 8 wherein the dynamic interface module comprises an intelligent view adapter dictionary that maps a plurality of different instructor interface views to respective combinations of student performance data, wherein the student performance data includes: (i) cognitive workload data indicative of a psychophysiological state of the student, (ii) eye-tracking data indicative of the gaze of the student; and (iii) flight maneuver data.

10. A computer-implemented method of assessing performance, the method comprising:

providing a simulation of a machine, by an interactive computer simulation station, to train a student in how to operate the machine;

receiving instructor assessment data from an instructor at the instructor operating station that is communicatively connected to the interactive computer simulation station;

automatically assessing a performance of the student during the simulation based on one or more rules in an automatic rules-based assessment module to thereby provide automatic assessment data;

receiving both the instructor assessment data and the automatic assessment data by an artificial intelligence (AI) module; and providing a hybrid performance assessment of the student by the AI module based on an AI assessment model trained using training sets of instructor assessment data and training sets of automatic assessment data.

11. The method of claim 10 comprising generating the AI assessment model by developing a consensus among a plurality of different grading models.

12. The method of claim 11 wherein the different grading models include a support vector machine model, a convolutional neural network model and a decision tree extreme gradient boosting model.

13. The method of claim 10 comprising the AI module communicating with the automatic rules-based assessment module to adjust one or more of the rules of the automatic rules-based assessment module in response to detecting a grading discrepancy with the AI assessment model.

14. The method of claim 10 comprising the AI module communicating with the instructor operating station to display grading feedback to the instructor in response to detecting a grading discrepancy with the AI assessment model.

15. The method of claim 10 comprising adapting a current training lesson and/or a lesson plan by an adaptive learning AI module in response to detecting that the hybrid performance assessment of the student falls below a predetermined threshold.

16. The method of claim 15 wherein the adapting of the lesson plan is performed by:

generating a deterministic lesson plan that prescribes a particular lesson for each grade or grade range that the student has achieved as determined by the hybrid performance assessment;

generating a probabilistic lesson plan based on a probability of succeeding at future lessons based on historical performance of the student; and combining the deterministic lesson plan and the probabilistic lesson plan to create a hybrid deterministic-probabilistic lesson plan that optimizes an order of the future lessons in the probabilistic lesson plan while also ensuring that every lesson in the deterministic lesson plan is taken.

17. The method of claim 10 comprising controlling an instructor interface view presented by a dynamic instructor interface of the instructor operating station by adapting the dynamic instructor interface in response to the performance of the student.

18. The method of claim 17 wherein controlling the instructor interface view comprises using an intelligent view adapter dictionary to map a plurality of different instructor interface views to respective combinations of student performance data, wherein the student performance data includes: (i) cognitive workload data indicative of a psychophysiological state of the student, (ii) eye-tracking data indicative of the gaze of the student; and (iii) flight maneuver data.

19. A non-transitory computer-readable medium having instructions in code which are stored on the computer-readable medium and which, when executed by one or more processors of one or more computers, cause the one or more computers to assess performance by:

providing a simulation of a machine, by an interactive computer simulation station, to train a student in how to operate the machine;

receiving instructor assessment data from an instructor at the instructor operating station that is communicatively connected to the interactive computer simulation station;

automatically assessing a performance of the student during the simulation based on one or more rules in an automatic rules-based assessment module to thereby provide automatic assessment data;

receiving both the instructor assessment data and the automatic assessment data by an artificial intelligence (AI) module; and providing a hybrid performance assessment of the student by the AI module based on an AI assessment model trained using training sets of instructor assessment data and training sets of automatic assessment data.

20. The computer-readable medium of claim 19 comprising code for generating the AI assessment model by developing a consensus among a plurality of different grading models.

21. The computer-readable medium of claim 20 wherein the different grading models include a support vector machine model, a convolutional neural network model and a decision tree extreme gradient boosting model.

22. The computer-readable medium of claim 19 comprising code to cause the AI module to communicate with the automatic rules-based assessment module to adjust one or more of the rules of the automatic rules-based assessment module in response to detecting a grading discrepancy with the AI assessment model.

23. The computer-readable medium of claim 19 comprising code to cause the AI module to communicate with the instructor operating station to display grading feedback to the instructor in response to detecting a grading discrepancy with the AI assessment model.

24. The computer-readable medium of claim 19 comprising code to provide an adaptive learning AI module for adapting a current training lesson and/or a lesson plan in response to detecting that the hybrid performance assessment of the student falls below a predetermined threshold.

25. The computer-readable medium of claim 24 wherein the code for adapting the lesson plan comprises code for:

generating a deterministic lesson plan that prescribes a particular lesson for each grade or grade range that the student has achieved as determined by the hybrid performance assessment;

generating a probabilistic lesson plan based on a probability of succeeding at future lessons based on historical performance of the student; and combining the deterministic lesson plan and the probabilistic lesson plan to create a hybrid deterministic-probabilistic lesson plan that optimizes an order of the future lessons in the probabilistic lesson plan while also ensuring that every lesson in the deterministic lesson plan is taken.

26. The computer-readable medium of claim 19 comprising code to provide a dynamic interface module to control an instructor interface view presented by a dynamic instructor interface of the instructor operating station by adapting the dynamic instructor interface in response to the performance of the student.

27. The computer-readable medium of claim 26 wherein the code for controlling the instructor interface view comprises code to provide an intelligent view adapter dictionary to map a plurality of different instructor interface views to respective combinations of student performance data, wherein the student performance data includes: (i) cognitive workload data indicative of a psychophysiological state of the student, (ii) eye-tracking data indicative of the gaze of the student; and (iii) flight maneuver data.

* * * * *